United States Patent Office

3,337,477
Patented Aug. 22, 1967

3,337,477
DIOL OF POLY(CYCLOHEXENE OXIDE)
Edwin J. Vandenberg, Foulk Woods, Del., assignor to Hercules Incorporated, a corporation of Delaware
No Drawing. Filed Oct. 20, 1965, Ser. No. 499,002
4 Claims. (Cl. 260—2)

This application is a continuation-in-part of my copending application Ser. No. 298,434, filed July 29, 1963.

This invention relates to new dihydroxy polyethers and, more particularly, to diols of poly(cyclohexene oxide).

It has previously been discovered that high molecular weight polymers of cyclohexene oxide can be prepared by polymerizing cyclohexene oxide under certain selected conditions, such as by using an organic diluent and an organoaluminum catalyst.

Now in accordance with this invention, it has been found that these high molecular weight polymers can be cleaved to produce polyethers having a terminal hydroxyl group at each end of the polymer chain. These new hydroxyl-ended polyethers may be defined as diols of poly(cyclohexene oxide) wherein each of the hydroxyls is terminal. These new diols have a number average molecular weight of from abuot 1000 to about 20,000, and preferably of from about 2,000 to about 10,000, and can be either crystalline or amorphous, depending on the structure of the long chain polymer which is cleaved.

The high molecular weight poly(cyclohexene oxide) is readily cleaved by reacting the polymer with an organometallic compound of an alkali metal; and the cleavage product is then treated with aqueous acid to hydrolyze the end groups to hydroxyl groups.

The theory of this invention is illustrated by the following equations for the cleavage of poly(cyclohexene oxide) with an organolithium compound (LiR), wherein abstraction of hydrogen on a carbon atom beta to the ether linkage leads to cleavage. As will be seen, there are, for any given ether linkage in the polymer chain of poly (cyclohexene oxide), four positions wherein a hydrogen is attached to a carbon beta to the ether linkage, hence, there are four possible chain cleavage reactions, two involving cleavage on the left side of the ether linkage and two involving cleavage on the right side of the ether linkage. The four cleavage reactions involving these four beta hydrogens ($\beta_1$, $\beta_2$, $\beta_3$ and $\beta_4$) are shown by Equations 1, 2, 3 and 4 below. R represents the remainder of the polymer chain in these equations. It will be noted that the left side $\beta_1$ cleavage and the right side $\beta_3$ cleavage produce the same product, viz, a poly(cyclohexene oxide) having one lithium alkoxide end group and one cyclohexene-1-enyl group; and that the left side $\beta_2$ and right side $\beta_4$ cleavage also produce the same product, viz, a poly(cyclohexene oxide) having one lithium alkoxide end group and one cyclohex-2-enyl end group.

Equations 5 and 6 show the types of cleavage that can occur when more than one type of beta hydrogen and both left and right side cleavage are involved. These equations illustrate combination cleavages involving $\beta_1$ and $\beta_3$ hydrogens (5), and $\beta_2$ and $\beta_4$ hydrogens (6). Obviously, combination cleavages involving $\beta_1$ and $\beta_4$ hydrogens, and $\beta_2$ and $\beta_3$ hydrogens, can also occur, and Product C is also obtained in these combination cleavages. Both of these latter combinations (i.e., $\beta_1$–$\beta_4$ and $\beta_2$–$\beta_3$) will differ from the combination cleavages of Equations 5 and 6 only in that one of the ether by-products thereof will have unsaturation alpha to the ether oxygen (as in Equation 5 and the other will have unsaturation beta to the ether oxygen (as in Equation 6). Obviously, in any one cleavage reaction, there will undoubtedly take place all of these various types of cleavages. Consequently, the end product will be a mixture of these cleavage products. As will be seen from these equations, under some conditions, part of the end groups in the cleavage product contain double bonds, e.g., cyclohex-1-enyl in Product A, and cyclohex-2-enyl in Product B. The cyclohex-1-enyl end groups are readily hydrolyzed to hydroxyl end groups by acid washing, as shown in Equation 9. The cyclohex-2-enyl end groups isomerize under the influence of the LiR' or LiOR present in the reaction mixture to cyclohex-1-enyl end groups which are readily converted to hydroxyl end groups by acid hydrolysis. Under other conditions, e.g., with excess organometallic, the double bond end groups can be further cleaved to convert them directly to LiO— end groups (as shown by Equations 7 and 8), which are readily converted to hydroxyl end groups by water washing, as shown in Equation 10.

Left Side Cleavage
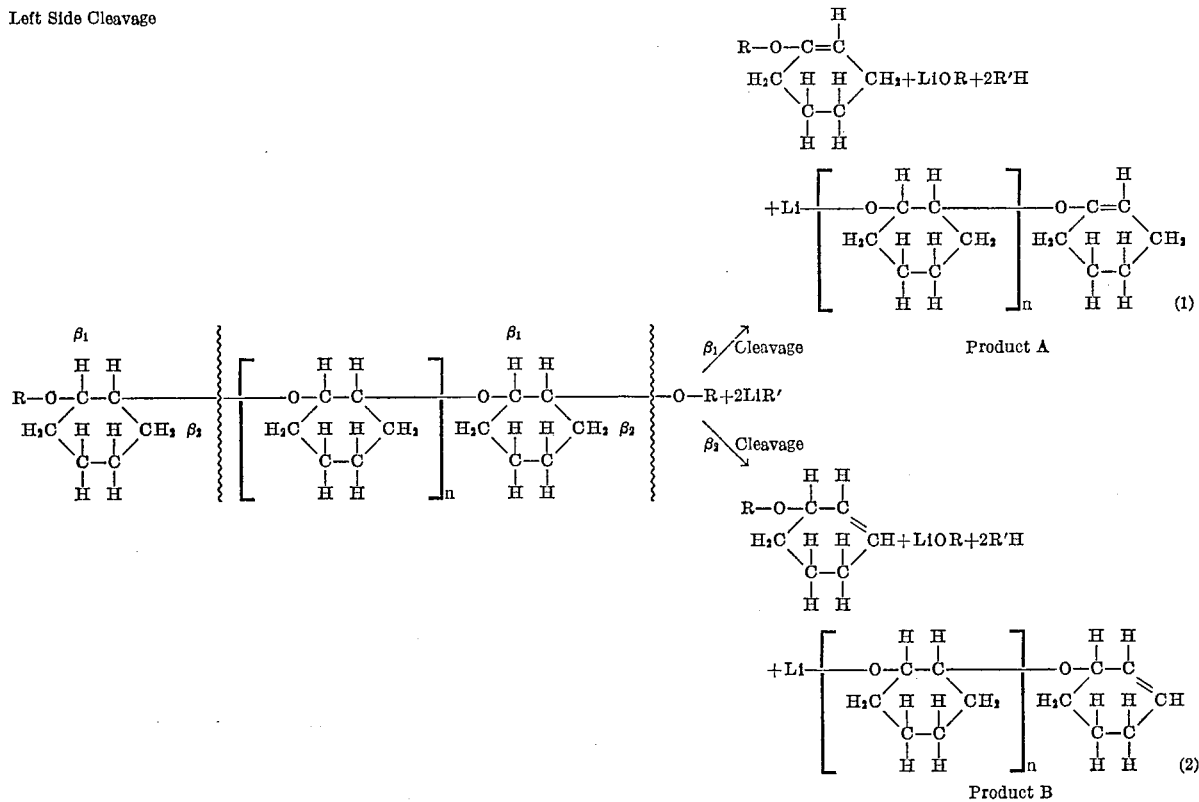
Right Side Cleavage
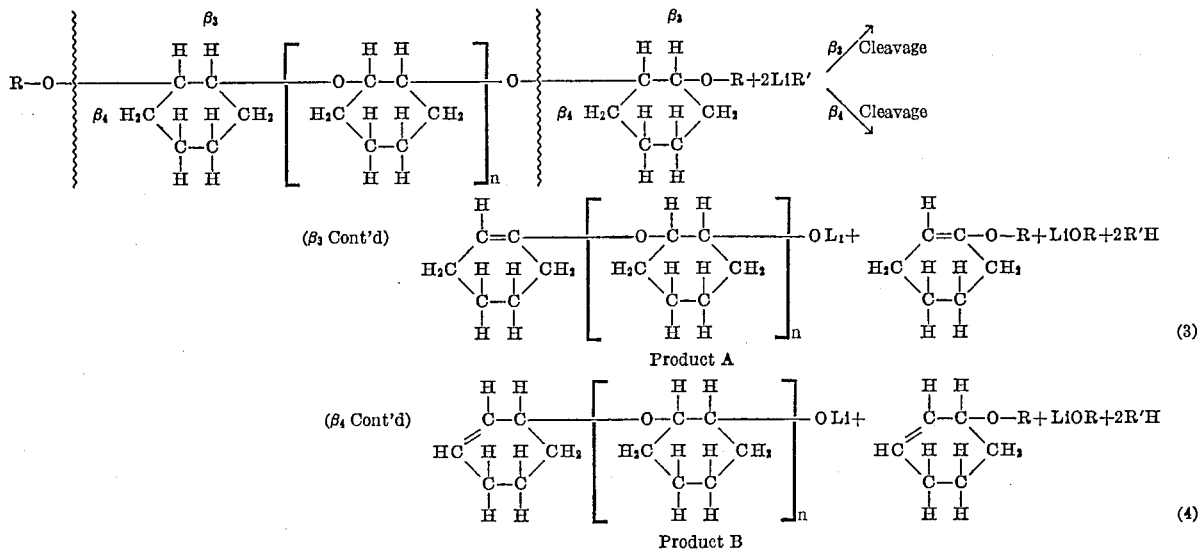
Left Side and Right Side Cleavage
Involving $\beta_1$ and $\beta_3$ Hydrogens
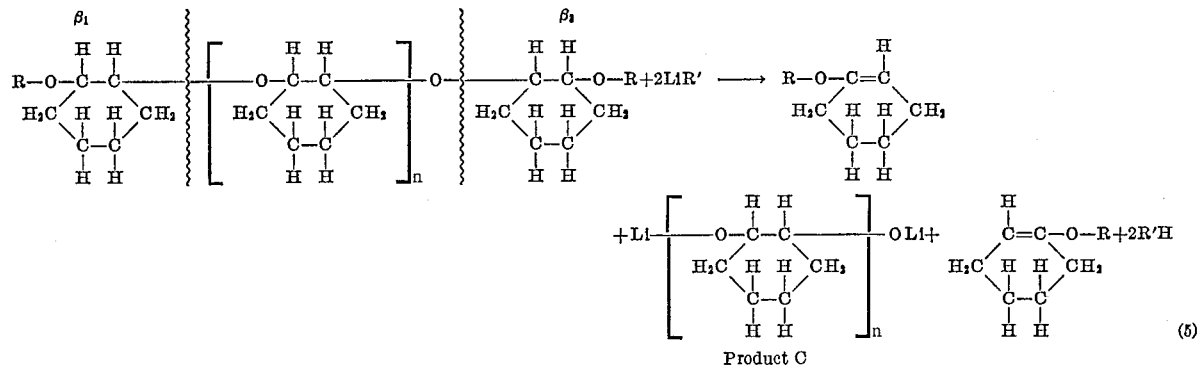

Left Side and Right Side Cleavage
Involving $\beta_2$ and $\beta_4$ Hydrogens

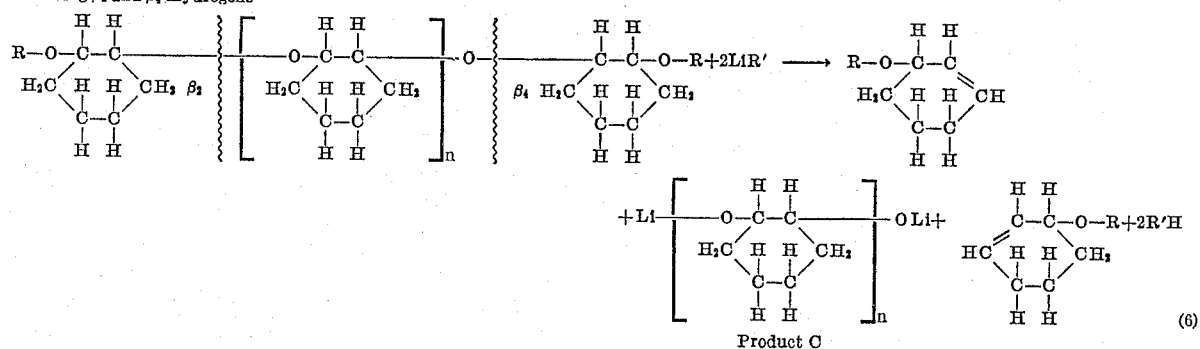

(6)

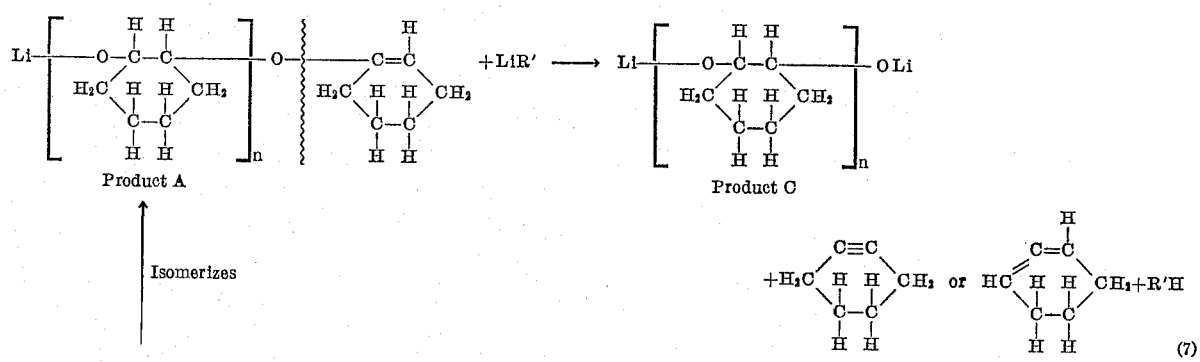

(7)

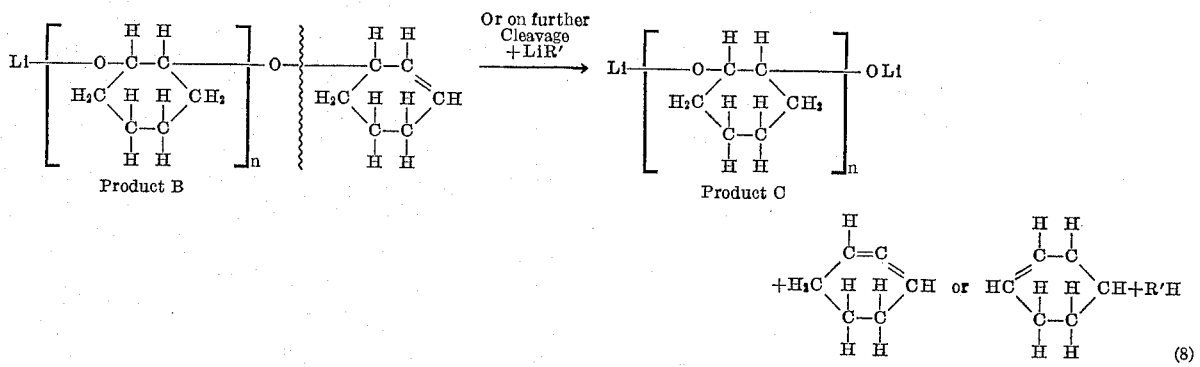

(8)

Hydrolysis of Product A

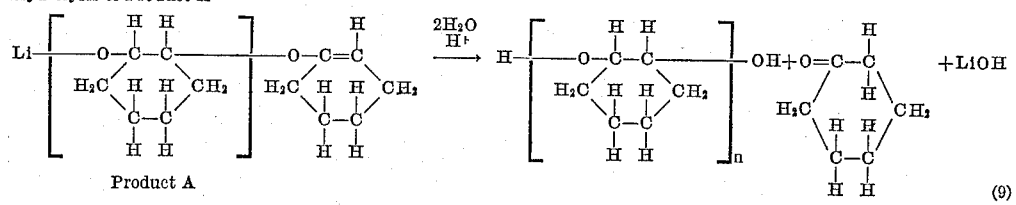

(9)

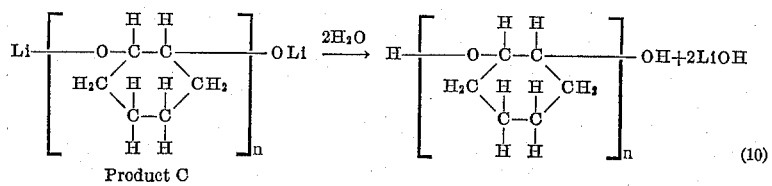

(10)

The cleavage reaction is carried out by reacting the high molecular weight poly(cyclohexane oxide) with an organometallic compound of an alkali metal. Any organometallic compound of an alkali metal, i.e., lithium, sodium, potassium, rubidium, or cesium, can be used. The organo moiety will preferably be a hydrocarbon group, as for example, an alkyl, aryl, alkenyl, alkynyl, cycloalkyl, cycloalkenyl, or aralkyl, etc., group. Exemplary of the alkali metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyllithium, lithium acetylide, methylsodium, ethylsodium, propylsodium, isopropylsodium, the butyl sodiums, amylsodium, dodecylsodium, benzylsodium, isopropenylsodium, allylsodium, octadecenylsodium, butadienylsodium, isoprenylsodium, butylrubidium, butylcesium, methyl-, ethyl-, propyl- and the butylpotassiums, allylpotassium, octylpotassium, phenylpotassium, cyclopentylpotassium, cyclohexenylpotassium, etc. The amount of the organometallic compound used will depend upon the amount of the cleavage desired, one molecule of the organometallic being required for each cleavage, i.e., per two chain ends. Thus, the amount of organometallic compound can vary from about 1% up to a large excess, as for example, 5 to 10 times the weight of the polymer being cleaved, but preferably will vary from about 1% to about 100% by weight of the polymer being cleaved.

The cleavage reaction can be carried out in the absence of a diluent, i.e., in a bulk process, but preferably is carried out in a diluent, which may be a solvent for the polymer being cleaved, or which may serve only as a dispersant for the polymer. Any organic liquid diluent which is inert under the reaction conditions can be used, as for example, aromatic hydrocarbons such as benzene, toluene, xylene, etc., aliphatic and cycloaliphatic hydrocarbons such as hexane, n-heptane, cyclohexane, etc., and mixtures of such hydrocarbons, as for example, petroleum, ether, gasoline, etc. Diluents which are capable of reaction with the organometallic compound, as for example, ethers, can also be used, provided that the rate of reaction of the cleaving agent with the polymer being cleaved exceeds the rate of reaction with the diluent. The concentration of the polymer in the diluent can vary from a fraction of about 1% up to an essentially diluent-free system. As already mentioned, the polymer can be dissolved in the diluent, or a slurry of the polymer in a diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which on cleavage become more and more fluid, or by carrying out the process in an extruder, after which the cleaved fluid product can be handled in more conventional equipment in a continuous process.

The cleavage reaction can be carried out over a wide temperature range, generally from about $-50°$ C. to about 200° C., depending on the cleaving agent used, the stability of the cleaving agent, etc. Preferably, the reaction is carried out at a temperature of from about $-20°$ C. to about 150° C., and more preferably from about 0° C. to about 125° C. The pressure can be atmospheric, subatmospheric or above atmospheric, as desired. In fact, pressures up to several thousand p.s.i. can be used if needed to keep the diluent in the liquid state.

The high molecular weight poly(cyclohexane oxide)s which are cleaved to prepare the diols of this invention can be prepared by any desired means. Polyethers of high molecular weight are readily prepared according to the process of my patent U.S. 3,135,705, issued June 2, 1964, using as the catalyst an organoaluminum compound reacted with water, and preferably with both water and a chelating agent. A typical catalyst preparation is carried out by reacting a solution of the organoaluminum compound, as for example, triethylaluminum or triisobutylaluminum, in a mixture of n-heptane and ether as solvent, with a equimolar amount of acetylacetone as chelating agent, and with 0.5 mole of water per mole of aluminum, and agitating the mixture at 30° C. for 16 to 20 hours. The polymerization is typically carried out by injecting the catalyst solution so prepared into a solution of the cyclohexene oxide in an inert diluent and agitating the mixture at room temperature or at elevated temperatures for several hours. Isolation of the polymer will depend on the solubility of the polymer in the reaction diluent, etc. The preparation of high molecular weight crystalline and amorphous poly(cyclohexene oxide)s will be more fully illustrated in the following specific examples.

Preferably, the poly(cyclohexene oxide) which is cleaved will be one of fairly high molecular weight so that the original end groups in the polymer being cleaved are an insignificant part of the total final end groups, and the individual polymer molecules in the cleaved product will then have hydroxyl end groups on both ends. The polymer being cleaved will preferably have a chain of at least about 100 of said monomer groups and, more preferably, at least about 500. The actual molecular weight of the polymer being cleaved and the number of cleavages per polymer molecule will, of course, depend on the purpose for which the final polymer is to be used.

The high molecular weight polymer can be isolated from the polymerization reaction vessel prior to the initiation of cleavage, or the cleavage reaction can be commenced in the same vessel without isolation.

To produce the diols of poly(cyclohexene oxide) of this invention, the reaction product of the above-described cleavage reaction must be treated to remove the alkali metal ions. This can be easily accomplished by simply washing the reaction mixture with water (basic, neutral or acidic) or with a weak acid solution (aqueous or nonaqueous), as for example, dilute hydrochloric, formic, acetic, oxalic, sulfuric, sulfurous, nitric, sulfonic or carbonic acids or the like. With the aqueous acid treatment, any cyclohex-1-enyl end groups present are hydrolyzed to the corresponding hydroxyl end groups.

The hydroxyl-ended polymers of this invention can be prepared in a wide variety of molecular weights, depending on the molecular weight of the starting polymer and the amount of cleavage to which it is subjected. In general, they will be prepared with a number average molecular weight of from about 1,000 to about 20,000, and preferably of from about 2,000 to about 10,000. These products are diols, having terminal hydroxyl groups on both ends of the polymer chains. The polymeric diols of this invention can be either crystalline or amorphous, depending on the structure of high polymer prior to cleavage.

Because the diol products of this invention have hydroxyl groups at each end of their polymer chain, they can be used in various chain extension reactions. The chain extending agents can be any polyfunctional compounds which react under appropriate temperature, pressure and catalyst conditions with the hydroxyl groups. They can be di- or polyisocyanates such as m- or p-phenylene diisocyanate, 2,4-toluene diisocyanate, 1,5-naphthyl diisocyanate, methylene di(p-phenyl diisocyanate), hexamethylene diisocyanate, triphenyl methane triisocyanate, etc.; di- or polyepoxides such as Epon resins, as for example, the digylcidyl ether of Bis Phenol-A, or di- or triaziridines, as for example, tris[1-(2-methyl) aziridinyl] phosphine oxide, tris(1-aziridinyl) phosphine oxide, or di- or polyanhydrides such as pyromellitic anhydride, or di- or polyimides such as phenylene bis-maleimide, etc. The difunctional chain extending agents are generally used in approximately stoichiometric amounts to the hydroxyl chain ends when a linear, soluble high polymer product is desired. When the chain extending agent contains more than two functional groups and is used in approximately stoichiometric amounts to the hydroxyl chain ends, the product is generally a cross-linked product. Alternatively, a cross-linked network can be obtained by using a combination of a difunctional active chain end polymer with low molecular weight similar polyreactive compounds. Thus, the diols of this invention, having hydroxyls on both ends of the polymer chain, on combination with a polyol such as glycerin, pentaerythritol, trimethylol propane, sorbitol, tetrakis(2-hydroxypropyl) ethylenediamine, or ethylene oxide or propylene oxide adducts of these polyols in combination with the diisocyanate will yield a cross-linked polyurethane network.

The new diols of poly(cyclohexene oxide) of this invention can also be converted to useful polyester and polyamide block copolymers by the usual polyester and polyamide forming reactions, using either a simple monomeric unit such as the phthalic acids or esters, or using preformed polyesters or polyamides with appropriate reactive chain ends. Interfacial polymerization is advantageously used to prepare such materials by using acid chlorides of dicarboxylic acids or of carboxy-ended polyesters or polyamides with the diols. Alternatively, an amine-ended polyamide can be reacted with a chloroformate-ended diol (formed by the reaction of the diol with phosgene) to give a polyether-polyamide block copolymer joined by polyurethane links. The chloroformate-ended diol can also be reacted by interfacial polymerization with hydrazine or simple diamines to form polyurethane-type products. The diols can also be end-capped, by reaction with at least two moles of a di- or polyisocyanate, to give a product with reactive isocyanate end groups which can then be reacted with a diamine, such as hydrazine, ethylenediamine, phenylenediamine, etc., or an amine-ended polyamide, to give block-type copolymers containing urea links which are advantageous for increasing the softening point and improving the abrasion resistance of the polymer.

The crystalline diols of this invention can be further modified to yield useful products. For example, they may be reacted in the presence of a base with other epoxides such as ethylene oxide, propylene oxide, butene-1 oxide, etc. Such adducts may be diadducts, i.e., where the hydroxyl end groups converted to more reactive hydroxyethyl (ethylene oxide reaction) or hydroxypropyl (propylene oxide reaction) end groups. Such products, because of their reactivity with isocyanates, are especially useful for foam, particularly for the very useful one-shot foam processes. The adducts may consist of large blocks (5 to 100 units) of ethylene oxide, amorphous propylene oxide, amorphous butene-1 oxides, etc. Such block polymers containing the diol units of this invention are unique, and are unusually useful surface-active agents, adhesives, and protective colloids. The ethylene oxide type are especially useful as detergents, dispersing agents, antistatic agents, dyeing aids, additives, or coatings for fibers to prevent soil redeposition during laundering, etc.

The instant diols of amorphous poly(cyclohexene oxide) are useful for making harder, more rigid polyurethane foams, coatings or cast articles. In this case, the rigidity is not due to crystallinity of the polyol, but instead due to the greater stiffness of the amorphous polymer chain.

The following examples illustrate the process of this invention. All parts and percentages are by weight unless otherwise indicated. All examples were run under a nitrogen atmosphere. The molecular weight of the polymers is indicated by their reduced specific viscosities (RSV). By the term "reduced specific viscosity" is meant $\eta_{sp}/c$ determined on a 0.1% solution in chloroform at 25° C. unless otherwise indicated. The number average molecular weight (Mn) was determined in benzene (heating to dissolve the polymer when necessary) using a Mechrolab osmometer. The calculated Mn was calculated from the hydroxyl analysis assuming two hydroxyls per chain. Hydroxyl analysis was determined by infrared and/or Zerewitinoff analysis. Where the melting point of the polymer is given, it was determined by differential thermal analysis (DTA).

*Example 1*

Cyclohexene oxide was polymerized as follows: Sixty (60) parts of cyclohexene oxide was mixed under nitrogen with 310 parts of n-heptane, the solution was cooled to −78° C. and then, while stirring, 28 parts of a 0.5 M n-heptane solution of triisobutylaluminum, which had been reacted with 0.5 mole of water per mole of aluminum, was added during 30 minutes. After 2 hours at −78° C., 20 parts of anhydrous ethanol was added, and the mixture was washed twice with 3% aqueous HCl, and then washed neutral with water. The polymer was precipitated by adding 4 volumes of anhydrous ethanol and the insoluble was collected, washed with ethanol and then with ethanol containing 0.1% phenyl β-naphthylamine, and finally was dried for 16 hours at 80° C. The product amounted to 59.3 parts and was a hard, tough, amorphous solid, which had an RSV of 1.9.

Fifteen (15) parts of this poly(cyclohexene oxide) was dissolved in 255 parts of anhydrous benzene. With stirring, 1.44 parts of lithium butyl in 9.0 parts of n-hexane was added at 30° C. After 15 minutes, the reaction was stopped by adding 6 parts of anhydrous ethanol. The reaction mixture was washed with 200 ml. of a 10% aqueous solution of hydrogen chloride, stirred for 15 minutes and then washed neutral with water, stripped and dried. The product amounted to 13.6 parts (91% yield) of a hard resin having an RSV of 0.12. Infrared analysis showed the presence of 2.2% hydroxyl and 0.45% carbonyl, presumably cyclohexanone by-product of the cleavage.

Part of the above crude product (11.8 parts) was purified by dissolving it in 40 parts of benzene, and then precipitating the polymer with 250 ml. of methanol. The methanol-insoluble polymer was collected, washed three times with methanol and then dried to yield 10.5 parts of a hard, brittle solid. It had an Mn of 3429. Infrared analysis showed the product to contain 1.3% hydroxyl (Mn calculated of 2620) and no carbonyl or unsaturation.

*Example 2*

Fifty (50) parts of cyclohexene oxide was mixed with 143 parts of n-heptane and with the temperature at 65° C., there was added 2.3 parts, based on triethylaluminum, of a triethylaluminum-0.5 water-0.5 acetylacetone catalyst. The catalyst was prepared by reacting a 0.5 M solution of triethylaluminum in 70:30 ether:heptane at 0° C. with 0.5 mole water per mole aluminum, the water being added over a period of 1 hour, and then 0.5 mole of acetylacetone per mole of aluminum, the acetylacetone being added over a period of 45 minutes, and then finally stirring the mixture one more hour at 0° C. and then 12 hours at 25° C. After 19 hours polymerization at 65° C., 20 parts of anhydrous ethanol was added. Ether was added to make it handleable and the mixture was twice stirred for 1 hour with 3% aqueous HCl and then washed neutral with water. The insoluble was collected, washed twice with ether, once with 0.05% of a phenolic antioxidant in ether, and dried 16 hours at 80° C. under vacuum. There was obtained 4.7 parts of poly(cyclohexene oxide), which was shown to be crystalline by X-ray, melted at 80° to 120° C., and had an RSV of 4.6.

This crystalline poly(cyclohexene oxide) was cleaved as described in Example 1 except that 15 parts of the polymer was dissolved in benzene by heating to reflux and, after cooling to 30° C., 3.0 parts of tert-butyllithium in 18 parts of n-hexane was added. There was obtained 9.0 parts of a hard, partly crystalline solid which, on analysis, was found to contain 2.5% hydroxyl and no other functional groups. The calculated Mn was 1360 and found was 1250.

*Example 3*

One hundred six (106) parts of the diol of poly(cyclohexene oxide) prepared in Example 1 was mixed with 52.6 parts of methylene di-p-phenyl diisocyanate and heated at 120° C. for 2 hours to give a prepolymer which was a hard solid at room temperature. At about 80° C., and with high speed stirring, there was added to the prepolymer 3.06 parts of water and 1.06 parts of silicone oil. The mixture then foamed, with a fair amount of exotherm.

The foam so produced was then cured for 20 minutes at 90° C. The resulting foam was hard, strong and rigid, with a uniform cell structure and a density of 7 lbs./cu. ft.

What I claim and desire to protect by Letters Patent is:

1. As a new composition of matter, a diol of poly(1,2-cyclohexene oxide), wherein each of the hydroxyl groups is attached to a terminal carbon of the polymer chain, said diol having a number average molecular weight between about 1,000 and about 20,000.

2. The produce of claim 1 wherein said diol has a number average molecular weight between about 2,000 and about 10,000.

3. The product of claim 1 wherein said composition is a crystalline diol of poly(1,2-cyclohexene oxide).

4. The product of claim 1 wherein said composition is an amorphous diol of poly(1,2-cycolhexene oxide).

References Cited

UNITED STATES PATENTS

| | | | |
|---|---|---|---|
| 2,522,155 | 9/1950 | Ballard et al. | 260—615 |
| 2,764,559 | 9/1956 | Wilkins | 260—611 |
| 2,870,100 | 1/1959 | Stewart et al. | 260—2 |

WILLIAM H. SHORT, *Primary Examiner.*

SAMUEL H. BLECH, *Examiner.*

T. PERTILLA, *Assistant Examiner.*

UNITED STATES PATENT OFFICE
CERTIFICATE OF CORRECTION

Patent No. 3,337,477

August 22, 1967

Edwin J. Vandenberg

It is hereby certified that error appears in the above numbered patent requiring correction and that the said Letters Patent should read as corrected below.

Column 2, line 8, for "cyclohexene-1-enyl" read -- cyclohex-1-enyl --; column 5, formula (9), after the second half of first bracket, insert subscript -- n --; same column 5, line 72 and column 7, line 58, for "(cyclohexane oxide)" each occurrence, read -- (cyclohexene oxide) --; column 6, formula (8), for the right-hand portion of the formula reading

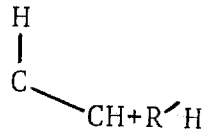   read   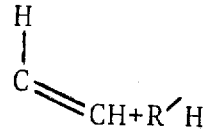

column 11, line 10, for "produce" read -- product --.

Signed and sealed this 10th day of September 1968.

(SEAL)
Attest:

EDWARD M. FLETCHER, JR.
Attesting Officer

EDWARD J. BRENNER
Commissioner of Patents